United States Patent [19]
Bhide et al.

[11] Patent Number: 5,625,811
[45] Date of Patent: Apr. 29, 1997

[54] METHOD AND SYSTEM FOR DATABASE LOAD BALANCING

[75] Inventors: Anupam K. Bhide, Foster City, Calif.; Daniel M. Dias, Mahopac, N.Y.; Ambuj Goyal, Amawalk, N.Y.; Francis N. Parr, Croton-On-Hudson, N.Y.; Joel L. Wolf, Goldens Bridge, N.Y.

[73] Assignee: International Business Machines Corporation, Armonk, N.Y.

[21] Appl. No.: 332,323

[22] Filed: Oct. 31, 1994

[51] Int. Cl.$^6$ ................................................ G06F 17/30
[52] U.S. Cl. .................. 395/602; 364/DIG. 1; 364/282.1
[58] Field of Search ........................ 395/600, 650

[56] References Cited

U.S. PATENT DOCUMENTS

| | | | |
|---|---|---|---|
| 3,702,006 | 10/1972 | Page | 395/650 |
| 4,633,387 | 12/1986 | Hartung et al. | 395/650 |
| 4,769,772 | 9/1988 | Dwyer | 395/600 |
| 4,819,159 | 4/1989 | Shipley et al. | 395/182.17 |
| 4,843,541 | 6/1989 | Bean et al. | 395/856 |
| 4,853,843 | 8/1989 | Ecklund | 395/600 |
| 4,925,311 | 5/1990 | Neches et al. | 395/650 |

FOREIGN PATENT DOCUMENTS 62-168497  7/1987  Japan.

OTHER PUBLICATIONS

D.M. Dias, B.R. Iyer and P.S. Yu, "Hybrid Data Sharing –Function Shipping Architecture for Multi-Systems and Control"; IBM Technical Disclosure Bulletin; vol. 30, No. 10; Mar. 1988, pp. 453–454.

Y.H. Lee and P.S. Yu, "FMRT: An Efficient Transaction Routing and Load Sharing Algorithm"; IBM Technical Disclosure Bulletin; vol. 33, No. 10B; Mar. 1991, pp. 355–360.

M. Auslander, A. Chang, S. Morgan, S. Moore, J.C. O'Quin and J.T. O'Quin, "Mirroring of Data in a Partition Basis", Reproduced from Research Disclosure, Jul. 1990, No. 315; ® Kenneth Mason Publications Ltd., England.

D.W. Cornell, D.M. Dias and P.s. Yu, "On Multisystem Coupling Through Function Request Shipping," IEEE Transactions on Software Engineering, vol. SE–12, No. 10, Oct. 1986, pp. 1006–1017.

P.S. Yu, D. Cornell, D.M. Dias and A. Thomasian, "Performance Comparison of IO Shipping and Database Call Shipping: Schemes in Multisystem Partitioned Databases," North–Holland Performance Evaluation 10 (1989), pp. 15–33.

J.L. Wolf, D.M. Dias, B.R. Iyer, and P.S. Yu, "Multisystem Coupling by a Combination of Data Sharing and Data Partitioning," IEEE Transactions on Engineering, vol. 15, No. 7, Jul. 1989, pp. 854–860.

*Primary Examiner*—Wayne Amsbury
*Attorney, Agent, or Firm*—Heslin & Rothenberg, P.C.

[57] ABSTRACT

A method and system are provided for partitioning a database and for balancing the processing load among processing nodes in a data processing system. A database partition is stored at each node and a logical owner node is assigned to each partition. The logical owner becomes responsible for all database requests related to the corresponding partition. Techniques for optimally assigning logical owners to all partitions in a system are provided and are responsive to parameters such as the load at each node, the combined load of the system, and the total number of assignments allowed. Techniques are also provided to accomplish the transfer of partition ownership between processing nodes when multiple transactions related to the partition are simultaneously occurring.

26 Claims, 8 Drawing Sheets

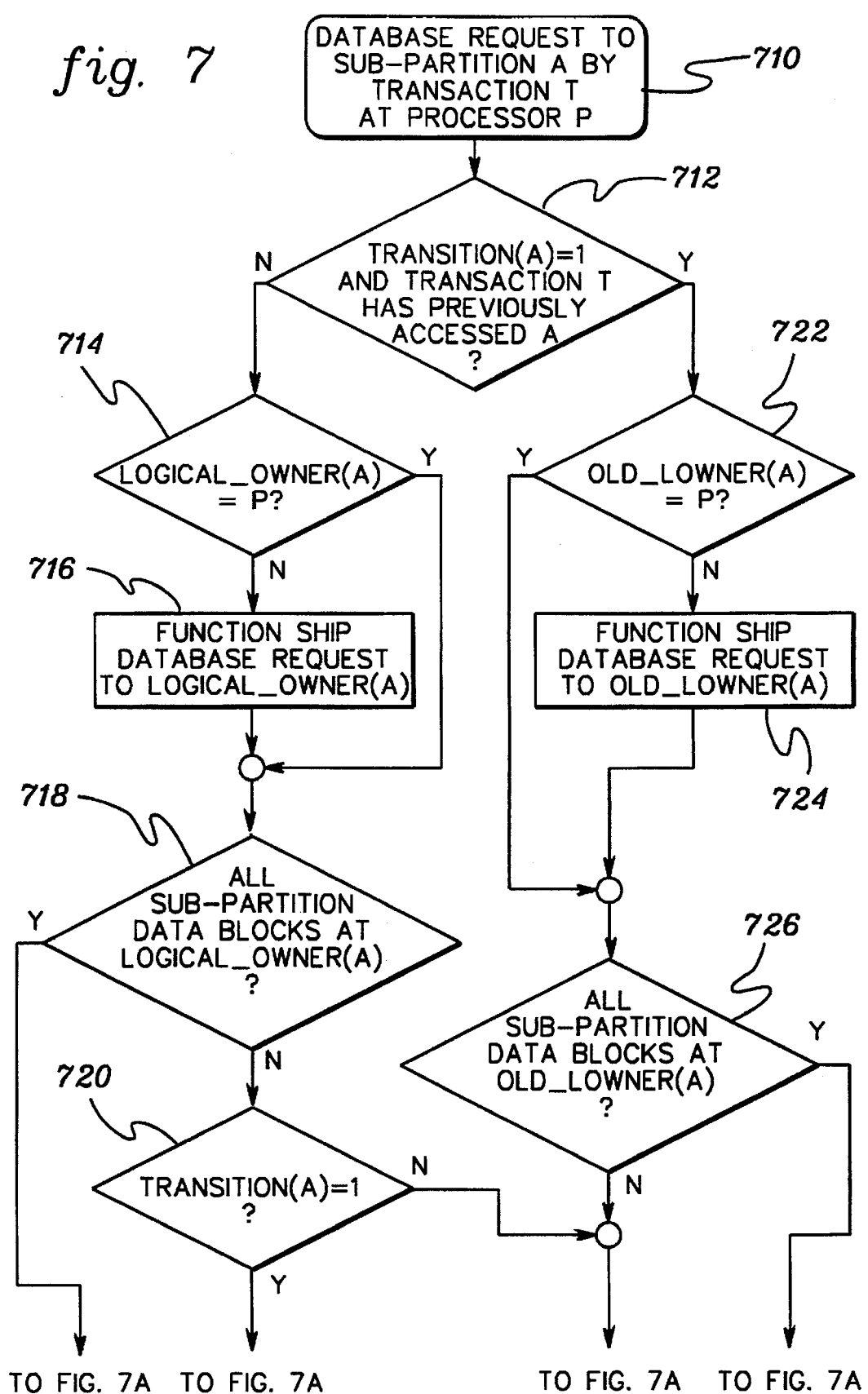

METHOD AND SYSTEM FOR DATABASE LOAD BALANCING

TECHNICAL FIELD

This invention relates in general to managing database systems in a multi-computing environment and in particular, to load balancing in such an environment.

BACKGROUND OF THE INVENTION

Modern computer systems often involve multiple, individual processors or nodes which are interconnected via a communication network. Large amounts of information are often stored and processed in such systems. In addition to processing equipment, each node typically has digital storage devices (e.g., magnetic disks) for storing the information. The information is often arranged as a database that occupies the available storage space at the various nodes in the system.

The techniques employed for arranging the required storage of, and access to a database in a computer system with multiple nodes are dependent on the requirements for the specific system. However, certain requirements are common to most systems. All data in the database should be available for access from any node in the system. The amount of storage overhead and processing overhead must be kept at a minimum to allow the system to operate efficiently, and the storage/access strategy must generally be immune to problems (e.g. overload) occurring at any one node.

Two general techniques of database storage, or partitioning, are employed in modern systems. The first, data sharing, generally involves providing physical access to all disks from each node in the system. Alternatively, this involves storing a copy of the complete database, with internal partitions, at each node in the system. Each node then has access to all partitions in the database, and is immune from problems at any one node. However, to maintain coherency of the database, global locking or change lists are necessary which ensure that no two nodes inconsistently change a portion of the database. An example of a data sharing architecture is described in U.S. Pat. No. 4,853,843 entitled "SYSTEM FOR MERGING VIRTUAL PARTITIONS OF A DISTRIBUTED DATABASE," issued on Aug. 1, 1989 and assigned to Tektronix, Inc. Described therein are nodes which contain separate instances of an initial database (i.e., virtual partitions) along with change lists which tabulate changes made to each partition. The change lists are then used to merge the virtual partitions. The processing overhead of the locks and/or lists, as well as the redundant storage of data are undesirable characteristics of this technique.

The second technique of data storage involves physically partitioning the data and distributing the resultant partitions to responsible or owner nodes in the system which become responsible for transactions involving their own, corresponding partitions.

This shared nothing architecture requires additional communication overhead to offer access to all of the data to all nodes. A requesting node must issue transaction requests to the owner node. The owner node then either: 1) performs the requested transaction related to its corresponding partition (i.e., function shipping) or 2) transfers the data itself to the requesting node (i.e., I/O shipping). An example of the shared nothing technique is described in U.S. Pat. No. 4,925,311 entitled "DYNAMICALLY PARTITIONABLE PARALLEL PROCESSORS," issued on May 15, 1990 and assigned to Teradata Corporation, in which each access module processor is assigned a substantial body of data stored in large individual memories and is constantly queuing incoming and outgoing messages from the network.

A problem with the shared nothing approach is the potential for processing overload at any one node and the resultant inability of that node to accept or process transactions relating to its partition. This condition can occur if, for example, the partition experiences unusually high transaction activity due to an unexpected event. Therefore, a need exists to balance the processing load among nodes in a shared nothing system should any one node become overloaded.

Load balancing may be done during the initial physical partitioning of the database. For example, predictions of the demand for certain physical partitions may be made, followed by an appropriate distribution of partitions to the nodes. Other load balancing techniques involve the partitioning of processing assets, for example, processors, disks, etc. between competing user programs; or an optimization of the transaction sequence. An example of load balancing is described in U.S. Pat. No. 4,843,541 entitled "LOGICAL RESOURCE PARTITIONING OF DATA PROCESSING SYSTEM," issued on Jun. 27, 1989 and assigned to International Business Machines Corporation, in which partitioning of resources into a plurality of logical partitions, defined by an administrator, is performed. The assets in a logical partition are then assigned to guest programs.

Examples of optimizing transactions (or queries) are found in U.S. Pat. No. 4,769,772 entitled "AUTOMATED QUERY OPTIMIZATION METHOD USING BOTH GLOBAL AND PARALLEL LOCAL OPTIMIZATIONS FOR MATERIALIZATION ACCESS PLANNING FOR DISTRIBUTED DATABASES" and U.S. Pat. No. 4,925,311 (discussed above). Both techniques, however, rely on an active owner node having processing resources available for transactions related to its corresponding partition.

Absent from all the above-mentioned patents is an automated method and an apparatus for load balancing in a shared nothing system when the owner node becomes overloaded, but which nevertheless provide timely completion of transactions related to the corresponding physical partition. The method should effectively reduce the transaction costs on the overloaded node, thereby minimizing the node's processing load. These costs generally include, in the shared nothing approach, the pathlength of the transaction (function) itself, the I/O shipping or function shipping communication overhead, and additional factors including two-phase commit processing necessary for each database access and concurrency control (in the case of I/O shipping). The approach should also minimize the overall processing load of the system.

SUMMARY OF THE INVENTION

The shortcomings of the prior art are overcome and additional advantages are provided through the provision of a method and system for partitioning a database in a data processing system. The method includes dividing the database into a plurality of data partitions, each of the plurality of partitions having a physical owner associated therewith, and assigning to each of the plurality of data partitions a logical owner wherein the logical owner provides access to its corresponding data partition. The method further includes storing each of the plurality of data partitions at its corresponding physical processing node, and performing one or more database requests associated with each of the plurality of data partitions at its corresponding logical processing node. The method further includes function shipping one or more database requests associated with each of the plurality of data partitions to the logical processing node associated with each of the plurality of data partitions, and I/O shipping one of the plurality of data partitions between its corresponding physical processing node and its corresponding logical processing node.

In another aspect of the invention, a method for transferring logical ownership of one of the plurality of data partitions from the logical processing node to a second logical processing node is provided. The steps of assigning and transferring can be repeatedly performed, thereby balancing a processing load in the data processing system. The step of transferring includes the step of maintaining one or more locks at either the logical processing node or the second logical processing node. One or more subsequent database requests associated with one of the plurality of data partitions is performed at its corresponding second logical processing node subsequent to the step of transferring. The step of transferring further includes maintaining a record of the transaction with interest in the one of the plurality of data partitions and performing a two-phase commit cycle for the transaction with interest.

In yet another aspect of the invention, the step of assigning includes the step of reassigning to one or more of the plurality of data partitions one or more next logical owners. The step of reassigning includes defining a neighborhood of solutions about one or more logical owners according to at least one definition constraint and searching the neighborhood of solutions for proposed one or more next logical owners according to at least one search constraint. The step of reassigning further includes, upon finding a proposed one or more next logical owners, checking the proposed one or more next logical owners according to at least one check constraint, and reassigning to the one or more plurality of data partitions the proposed one or more next logical owners if a result of the step of checking is acceptable. The check constraint, search constraint, and definition constraints can be chosen from the following: a maximum transaction cost at one of said one or more next logical owners, a maximum number of assignments different from the one or more logical owners, a maximum number of assignments different from the one or more logical owners, a minimum achievable system response time, and one or more predefined allowable assignments.

In still another aspect of the invention, a system is provided for performing the above-discussed steps of dividing the database, logical owner assignment, transferring ownership, and reassignment to one or more next logical owners.

Therefore, an automated method and system for load balancing in a shared nothing system are provided. The method and system operate when a owner node becomes overloaded and provide timely completion of transactions related to a corresponding physical partition. The method and system effectively reduce the transaction costs on the overloaded node, and thereby minimize the node's processing load. The overall processing load of the system is also minimized during the assignment and transfer.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIGS. 7–7a depict one example of a flow diagram which illustrates the transactions associated with a sub-partition which is in transition, in accordance with the principles of the present invention.

BEST MODE FOR CARRYING OUT THE INVENTION

In accordance with the principles of the present invention, a method and system for partitioning a database in a data processing system and for balancing a processing load within a data processing system are provided. The present invention provides a partitioning scheme such that responsibilities related to partitions of the database are allocated between a physical partition owner (i.e., the node at which a particular portion is stored) and a logical partition owner. The logical and physical owners can be identical or different nodes, but will initially be identical. The database therefore becomes logically partitioned among the processing nodes, and underlying the logical partitioning there is a physical partitioning.

In accordance with the present invention, load balancing is accomplished by assigning the logical ownership of a database partition to a processing node which is not overloaded. The logical owner is assigned via techniques described herein which ensure an optimum load balance across the processing system. Also in accordance with the present invention, techniques are described which effect the actual transfer of logical ownership from one node to another (e.g., initially from the processing node on which the data is stored to another node). During a transition period, concurrent transactions related to the subject partition may occur on both the "old" logical owner and the "new" logical owner. A technique for concurrency control between two concurrent transactions is provided. Reassignments occur as required by recurring load imbalances in the system.

Following an initial assignment and/or reassignment, and transfer of logical ownership, database requests of transactions related to the subject partition will occur on the new logical owner node. Therefore, all function call overhead including concurrency control overhead, I/O overhead for hot data and data found in the logical owner's buffer, and all commit processing overhead is off-loaded from the old logical owner to the new logical owner. This off-loading effects a load balance between the nodes of the processing system. The invention is now discussed in greater detail with reference to the drawings.

Figure 1:
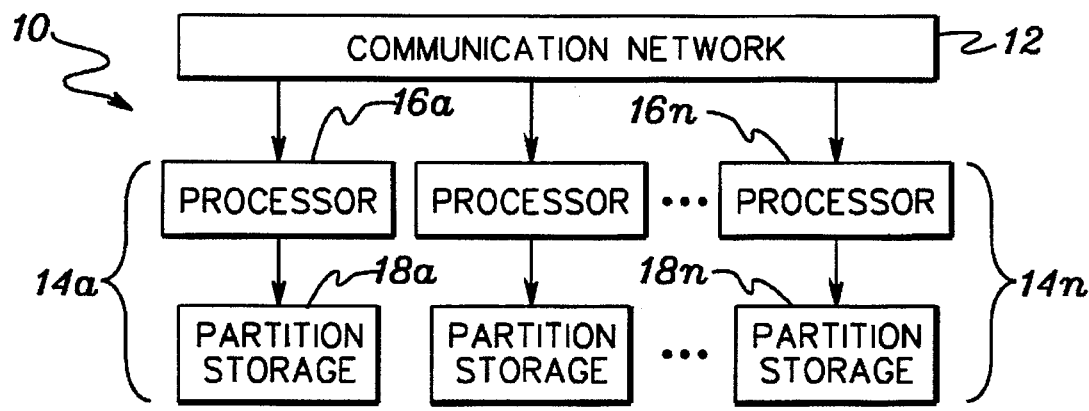
FIG. 1 depicts one example of a computer system which exemplifies an environment for assigning logical owners, in accordance with the principles of the present invention.
Figure 2:
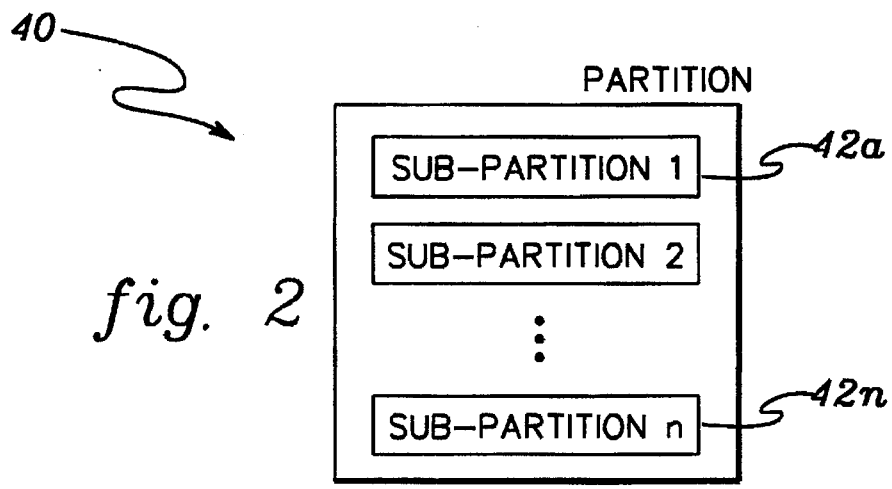
FIG. 2 depicts one embodiment of a conventional database partition having sub-partitions.

Referring to FIG. 1, a processing system 10 is depicted which includes a communication network 12. The network allows communication between multiple processing nodes, including processing nodes 14a–14n (collectively referred to as processing nodes 14). Each of processing nodes 14 may include processing and storage devices, e.g., a processor 16a–16n, respectively, and a storage device 18a–18n, respectively. In a shared nothing database, as discussed above, a different partition of a database is stored in each storage device. Each partition may also include multiple sub-partitions as shown in FIG. 2. For example, a partition 40 includes multiple sub-partitions, including sub-partitions 42a–42n.

In a conventional shared nothing system employing function shipping, database requests of a transaction arising at, for example, node 14n (i.e., a requesting node), which relate to a partition or sub-partition stored at node 14a, are communicated to node 14a from node 14n over communication network 12, and node 14a thereafter processes the database request. (A database request may in general relate to more than one sub-partition. For simplicity, it is herein assumed that a request relates to one sub-partition. Those skilled in the art will realize that a request that involves multiple sub-partitions can be broken down into separate requests and the methods disclosed herein would apply equally to each request.) Alternatively, the relevant sub-partition could be I/O shipped between the nodes for the duration of the transaction which is performed at the requesting node 14n. Associated with either approach are delays should node 14a become overloaded.

The techniques of the present invention provide timely completion of the transaction by assigning logical ownership of the sub-partitions to nodes that are not currently overloaded. Database requests corresponding to the transaction that relates to a partition or sub-partition are performed at the node to which logical ownership has been assigned (i.e., the logical owner). This owner may be, but isn't necessarily, distinct from the physical owner, i.e., the node at which the data is actually stored.

Figure 3:
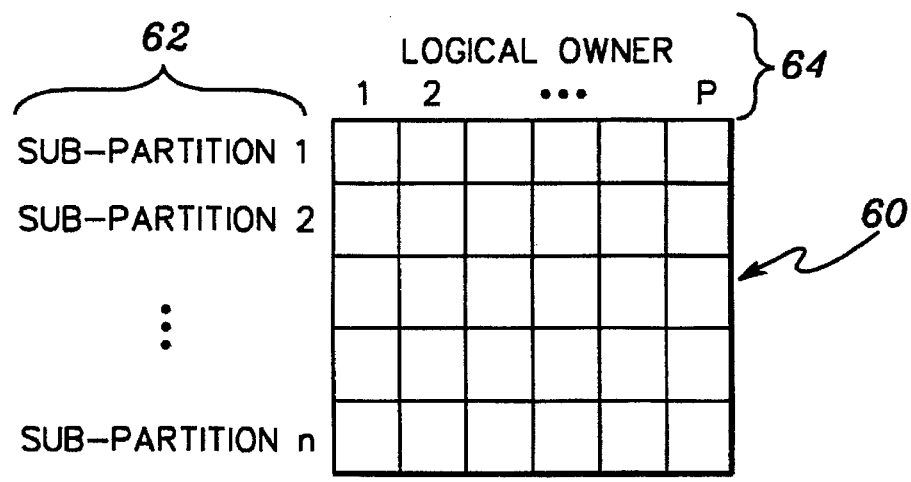
FIG. 3 is a table which illustrates one aspect of assigning logical owners to each sub-partition of FIG. 2, in accordance with the principles of the present invention.

In accordance with one embodiment of the invention, a logical owner can be assigned to each sub-partition within a partition as shown in FIG. 3. An ownership table 60 for each partition 40 is defined with one or more rows 62 corresponding to each sub-partition within a partition and one or more columns 64 corresponding to all possible logical owners in the processing system. In this embodiment, each sub-partition may be assigned a different logical owner. The sub-partitions are all part of the same partition stored at a node and therefore have the same physical owner. Though the embodiments described herein employ partitions divided into sub-partitions, those skilled in the art will recognize that the logical ownership principle of the present invention applies equally to single partitions or sub-partitions stored at a node. The term "partition" therefore generally indicates a single partition, a single sub-partition, or multiple sub-partitions. The principle also applies to partitions or sub-partitions which have more than one physical owner, i.e., a partition may overlap across nodes. An assignment, as used herein, can either be the initial assignment from the physical owner to the logical owner, or any subsequent reassignment between logical owners.

Initially, each sub-partition is stored at its physical owner and a logical owner is assigned to each sub-partition. Therefore, at first, in one embodiment, the physical and logical owners of a sub-partition are the same node. Following a decision to balance the processing load within the system which is based on, for example, one node becoming overloaded, a reassignment of a logical owner to one or more sub-partition occurs. The assignment/reassignment technique is provided in accordance with the principles of the present invention and is described in detail below. The assignment technique includes imposed constraints, such as, for instance, minimizing the number of sub-partitions assigned different logical owners, minimizing the total processing load on the system, and minimizing the maximum processing load experienced at any one node. Recurring load imbalances will necessitate similar reassignments and updated load parameters will affect these reassignments.

After an assignment/reassignment is made which satisfies the imposed criteria, the ownership of the sub-partition is transferred from an old logical owner to a new logical owner. This transfer, provided in accordance with the invention, is also described in detail below and includes managing existing transactions associated with the sub-partition until the new logical owner becomes fully responsible for all related transactions. Assuming an assignment of, and successful transfer to, a new logical owner of a sub-partition, a table similar to that shown in FIG. 3 is updated with the new logical owner and database requests of transactions for the relevant sub-partition are thereafter performed at the new logical owner.

Following an effective assignment and transfer, the sub-partition will not be permanently stored at the new logical owner. Therefore, during a transaction, an I/O request may be performed from the new logical owner to the physical owner to retrieve the data. The logical owner maintains a buffer of blocks recently retrieved from the physical owner. Thus, any hot data (i.e., recently retrieved data) will be available in the logical owner buffer, eliminating the need for subsequent I/O requests for hot data to the physical owner. All concurrency control for the data will be performed by the logical owner. Finally, at transaction commit time, the logical owner will participate in two-phase commit processing, but the physical owner does not. Concurrency control overhead and two-phase commit processing overhead are therefore off-loaded to the logical owner because all accesses to the data are through the logical owner.

Summarizing, all function call overhead including concurrency control overhead, I/O overhead for hot data and data found in the logical owner buffer, and all commit processing overhead is off-loaded from the physical owner to the logical owner. Load balancing between nodes is therefore effectively accomplished in accordance with the present invention.

Figure 4:
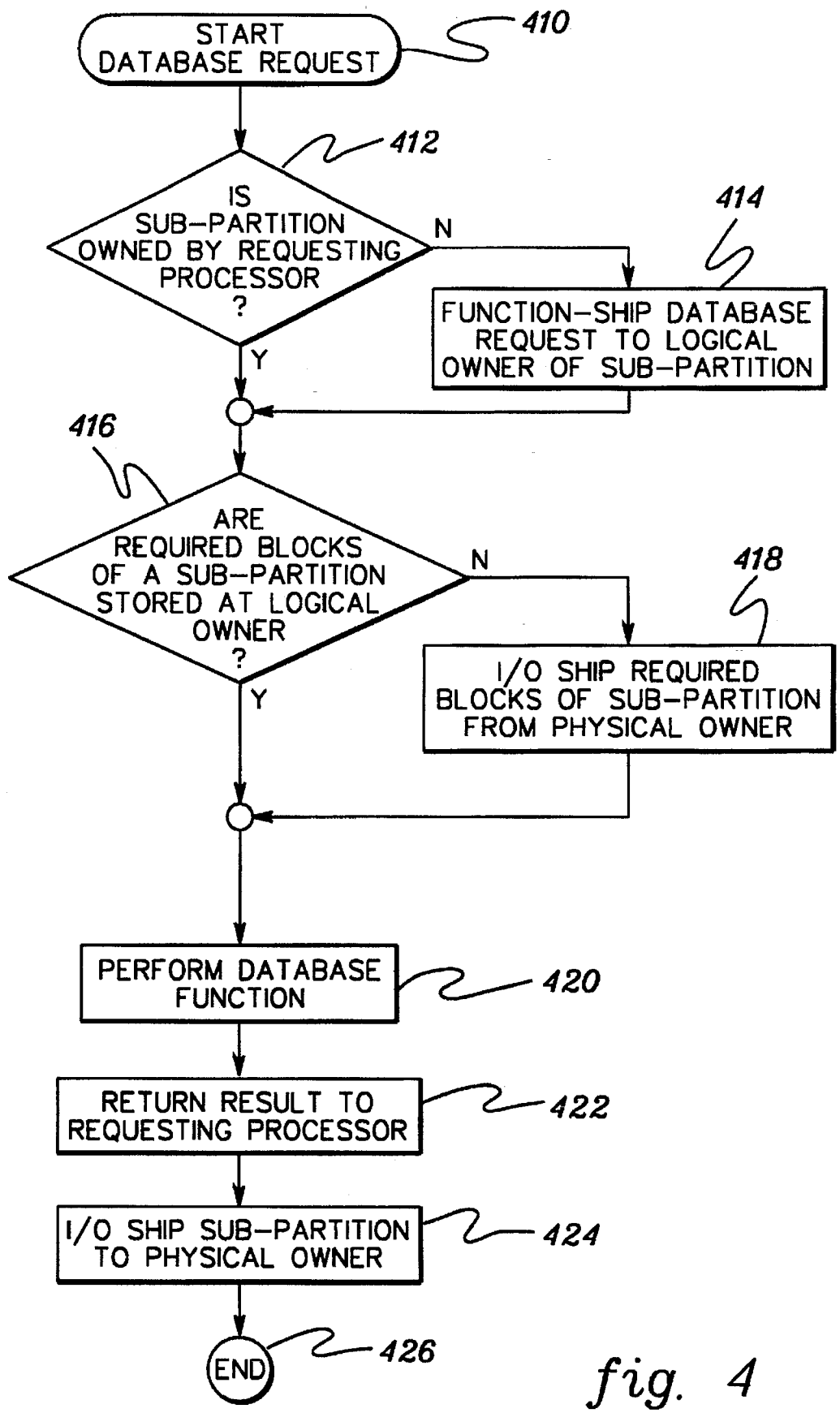
FIG. 4 is one embodiment of a flow diagram which illustrates a typical database request following an assignment of logical ownership, pursuant to the principles of the present invention.

Depicted in FIG. 4 is one example of a database request of a transaction being performed following an effective assignment and transfer of logical ownership of a sub-partition, in accordance with the principles of the present invention. (Additional detail will be shown in FIG. 7, which accounts for sub-partitions in transition.) Initially, a start database request is received, STEP 410, "START DATABASE REQUEST," which is followed by INQUIRY 412, "IS SUB-PARTITION OWNED BY LOCAL PROCESSOR?" If the logical owner and requesting processors are different, STEP 414, "FUNCTION SHIP DATABASE REQUEST TO LOGICAL OWNER OF SUB-PARTITION" results in which a function call is passed, over the communication network, to the proper logical owner of the sub-partition. Thereafter, a determination is made of whether the required data blocks of a sub-partition are in a buffer at the logical owner (e.g., hot data recently retrieved) INQUIRY 416, "ARE REQUIRED BLOCKS OF A SUB-PARTITION STORED AT LOGICAL OWNER?" A negative outcome results in STEP 418, "I/O SHIP REQUESTS BLOCKS OF A SUB-PARTITION FROM PHYSICAL OWNER," in which the subject data is retrieved from the physical owner.

With the sub-partition resident at the logical owner, STEP 420, "PERFORM DATABASE FUNCTION," occurs at the logical owner. Following this database request, a result is returned to the requesting processor in STEP 422 and the blocks of that sub-partition may be I/O shipped back to its physical owner in STEP 424. This final step may be delayed or eliminated under proper conditions. For example, repeated requests to a particular sub-partition may result in a determination that the sub-partition temporarily reside at the logical owner. In addition, the logical owner may delay an I/O call to a particular processor and accumulate data blocks to be shipped simultaneously to decrease the amount of communication overhead associated with individual I/O transfers. Each logical owner is therefore equipped with an appropriate buffer to accommodate these requirements. It will be understood to one of ordinary skill in the art that variations on the logic flow may occur without departing from the spirit of the invention.

Having introduced and discussed the concept of assigning logical ownership and how a request, given an assignment, is performed, techniques for the effective selection of new logical owners (i.e., to effect a proper load balance) are now presented. As noted above, the processing load from an overloaded processing node is shifted to another node via an assignment of logical ownership to that different node. However, in one embodiment, the selection of new logical owners is made prior to the assignment. This selection is governed by a method and constraints pursuant to the present invention to effect a proper load balance. Those skilled in the art will recognize that other techniques are available for this selection.

Pursuant to this embodiment of the selection technique, a variable O denotes the number of sub-partitions and a variable P denotes the number of processing nodes in the system. Each sub-partition $i \in \{1, \ldots, O\}$ has a node $\pi_i \in \{1, \ldots, P\}$ which is its physical owner, and is initially assigned logically to its starting node $s_i \in \{1, \ldots, P\}$, which may or may not be different from its physical owner. A variable $\alpha_i > 0$ denotes the processing cost incurred on the physical owner if sub-partition i's physical and logical ownership coincide. Otherwise, object i incurs processing costs on both its physical owner and its logical owner. These costs are defined as $\beta_i > 0$ and $\gamma_i > 0$, respectively. Logical assignments are costly, and it is therefore assumed that $\beta_i + \gamma_i > \alpha_i$ for all i.

A logical assignment is denoted by $x = \{x_1, \ldots, x_O\}$, where $x_j \in \{1, \ldots, P\}$ for all $1 \leq i \leq P$, so that object j is logically assigned to processor $x_j$. There is a natural metric on the space of possible logical assignments. Specifically, if $x = \{x_1, \ldots, x_O\}$ and $y = \{y_1, \ldots, y_O\}$ are two such assignments, then the distance between x and y is defined as:

$$d(x,y) = \text{card}\{i \in \{1, \ldots, O\} | x_i \neq y_i\}$$

Thus, the distance is the number of sub-partitions for which the logical assignments in x and y are to different nodes.

A new logical assignment $x = \{x_1, \ldots, x_O\}$ is required such that the maximum load across all nodes is minimized. This new logical assignment should result in (i) the loads across the nodes being relatively balanced, and (ii) at the same time keeping the number of objects logically assigned to a node other than the physical owner as small as possible. This is a minimax optimization problem, defined as follows: Minimize $$\max_{1 \leq j \leq P} c_j$$

where $$c_j = \sum_{x_i = \pi_i = j} \alpha_i + \sum_{x_i \neq \pi_i = j} \beta_i + \sum_{\pi_i \neq x_i = j} \gamma_i$$

and $$x_i \in \{1, \ldots, P\} \; \forall \, i \in \{1, \ldots, O\}$$

There may be additional, optional constraints as well. For example, it may be required that:

$$d(x,s) \leq D$$

for some D, which would have the effect of limiting the number of assignment changes that could be made. Similarly, it may be required that:

$$x_i = f_i \, \forall i \in S$$

for some subset $S \subseteq \{1, \ldots, O\}$ with $f_i \in \{1, \ldots, P\}$, for all $i \in S$, which would have the effect of fixing certain objects. In particular, $f_i = s_i$, or $f_i = \pi_i$ may be chosen in some situations. In addition to these explicit constraints, recall that it is desirable, in one embodiment, to have an implicit objective of minimizing $d(x,\pi)$, since temporary assignments are costly. The overall cost incurred on all processors is minimized to:

$$\sum_{i=1}^{P} \alpha_i$$

when all objects are logically assigned to their physical owners. Logical assignments to other nodes are only undertaken for load balancing, as one example.

The optimization problem described above is solved using a neighborhood escape technique, with additional steps and constraints provided pursuant to the principles of the present invention.

In a standard neighborhood escape technique, a finite nested sequence of K increasing neighborhoods about each point in the space of all solutions is imposed. Initially, the starting solution is the current solution. The iterative portion of the method is then as follows: Given the current solution, search the first (smallest) neighborhood for an improved feasible solution. If one is found, then this solution (or, alternatively, the best feasible solution in the first neighborhood) is made the current solution, and the iterative portion of the method is repeated with the new solution. If no feasible solution is found, then the search is expanded to include the remaining portion of the second neighborhood, the next, and so on. For further details on neighborhood escape techniques, see, for example, "Integer Programming," R. Garfinkel and G. Nemhauser, Wiley-Interscience, 1972, which is incorporated herein by reference in its entirety. Eventually, either a feasible improvement is located, the new solution is made the current solution, and the entire process is repeated; or the number of neighborhoods to search is exhausted, and the method is terminated with the current solution.

The current problem could be solved using the neighborhood structure imposed by the distance metric. Specifically, let $N_k(x) = \{y | d(x,y) = k\}$. The Kth neighborhood about N therefore consists of:

$$\bigcup_{k=0}^{K} N_k(x)$$

Employing this technique for the current problem would work well except for the fact that it ignores the constraint of minimizing $d(x,\pi)$. Therefore, pursuant to the present invention, the assignment search is partitioned according to the following:

$$M_{k,l}(x) = N_k \cap \{y | d(y, \pi) = d(x, \pi) + l\}$$

This additional structure partitions $N_k(x)$ into $2k+1$ sets $M_{k,-k}, \ldots, M_{k,0}, \ldots, M_{k,k}$. The most desirable neighborhoods $M_{k,l}$ to search are those with the lowest $l$ values. This is incorporated into the neighborhood search procedure by ordering the search first by lowest $l$ value, and, in the event of ties, second by lowest $k$ value. For example, in a $K=2$ neighborhood search about the point $x$, the following order results: $M_{2,-2}(x), M_{1,-1}(x), M_{2,-1}(x), M_{1,0}(x), M_{2,0}(x), M_{1,1}(x), M_{2,1}(x), M_{2,2}(x)$.

The neighborhood search is also constrained to moves which have a positive cost effect, in other words, moves which reduce the maximum value of $c_j$.

Also pursuant to the present invention, a queuing network model (QNM) may be employed which computes the mean response time for any solution located by the above search technique. The reference "Computer Performance Modeling Handbook," S. S. Lavenberg (Ed.), Academic Press, 1983, contains additional information regarding such models and is incorporated herein by reference in its entirety. The theoretical minimum response time (not necessarily achievable) occurs when the total cost on all processors is:

$$\sum_{i=1}^{Q} \alpha_i / P$$

By bounding the response time as part of an additional stopping criteria test, searching past a point of diminishing returns can be avoided.

The principles of the present invention related to the assignment technique present numerous advantages for this particular problem. First, the problem has exponential complexity as written, whereas the proposed method will find an acceptable solution in a small amount of time. Second, the input parameters $\alpha_i$, $\beta_i$, and $\gamma_i$ are relatively "soft" and a truly optimal solution based on a less than totally firm set of input parameters is not likely to be better in practice than a very good suboptimal solution. Third, the proposed method is very robust. Small changes to the formulation of the problem (objective function, constraints) are unlikely to affect the outcome. This is not always the case for exact solution approaches.

Figure 5:
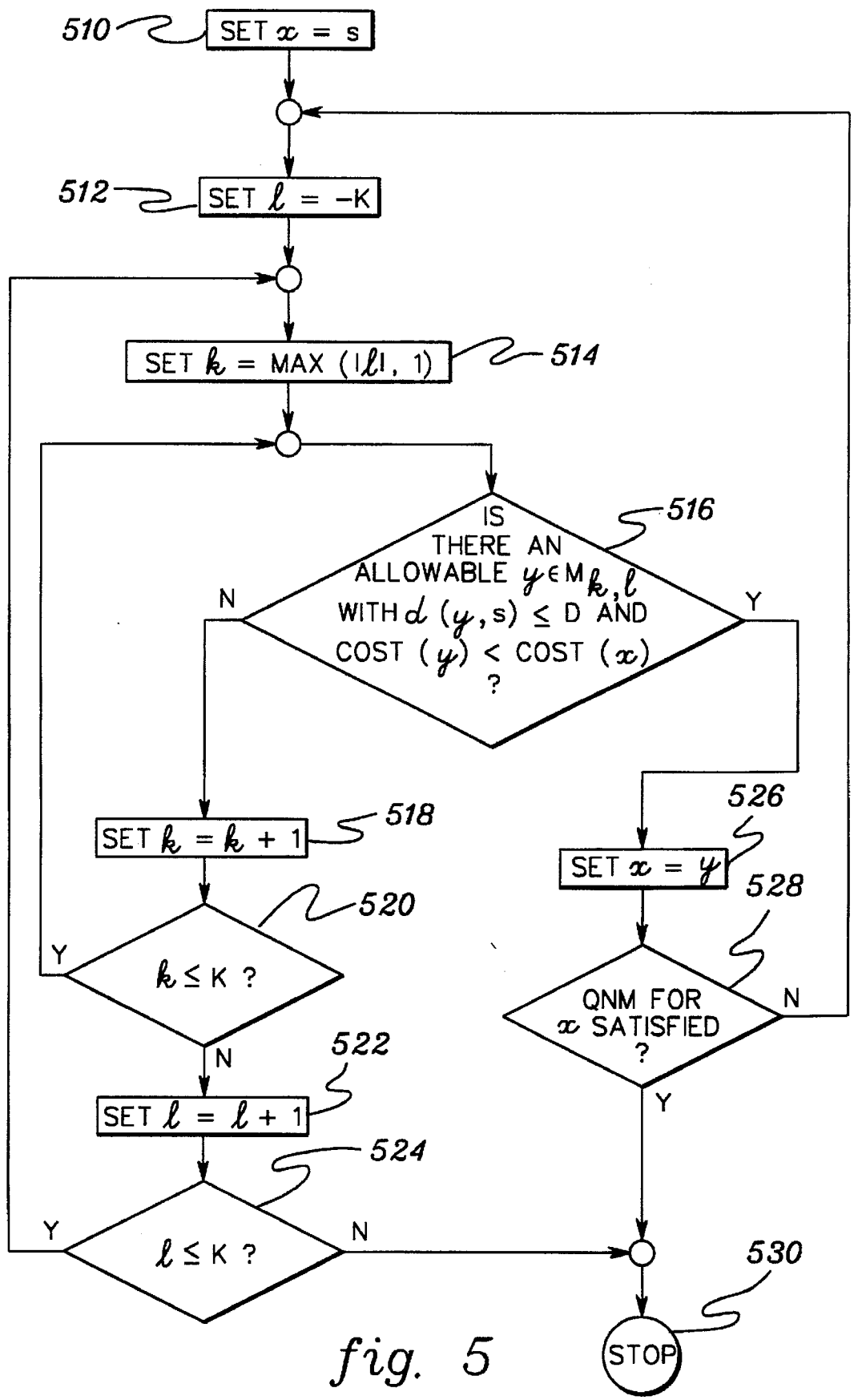
FIG. 5 is one embodiment of a flow diagram which illustrates the steps necessary to effect an assignment and load balancing constrained by defined parameters, in accordance with the principles of the present invention.

Referring now to FIG. 5, a flow diagram for the search for a solution is shown. The search is commenced in the neighborhood of the present solution s, with the search constraints of minimizing $d(x,\pi)$, $d(x,s)$, and the mean system response time as determined by the queuing network model (QNM).

Entry is through STEP 510, "SET x=s," which sets the initial solution to the present solution. The search sequence is begun in STEP 512, "SET l=-K." The parameter K as used here constrains the search to a distance between the assignment and the physical owners $\pi_i$. Proceeding to STEP 514, "SET k=MAX (|l|,1)," the index k is also set to constrain and order the search about the neighborhood of x.

In INQUIRY 516, "IS THERE AN ALLOWABLE $y \in M_{k,l}$ with $d(y,s) \leq D$ and cost $(y) <$ cost $(x)$?", a proposed solution y from the constrained neighborhood $M_{k,l}$ is chosen and the cost is compared to the cost of the present solution x. As mentioned above, an additional constraint is possible, i.e., specifically fixing, or denying logical assignments to certain sub-partitions according to predefined allowable assignments. This test is implied by the term "ALLOWABLE." In addition, the constraint of a maximum number of moves D from s is also checked. If the result of INQUIRY 516 is positive, STEP 526, "SET x=y" is encountered which temporarily sets a solution.

INQUIRY 528, "QNM FOR x SATISFIED?" next performs the queuing network model test which measures the mean system response time for this proposed solution. If the result is satisfactory, the routine is halted at STEP 530, "STOP," and the present solution x becomes the next assignment. If the result of INQUIRY 528 is negative, the search continues in the neighborhood about this temporary solution.

Returning to INQUIRY 516, if the result is negative (and continues to be negative), STEPS and INQUIRIES 518, 520, 522 and 524 are iteratively encountered which constrain and order the search pursuant to the principles of the present invention, as discussed above. It is possible that no lower cost solution is located, in which case a negative result finally occurs in INQUIRY 524, thereby halting the search through STEP 530, "STOP."

In combination with a proper assignment, an operation is required which transfers the logical ownership of a sub-partition from one logical owner (e.g., "X") to another logical owner (e.g., "Y"). Physical movement of the data is not performed, however, the performance of the transactions relating to a sub-partition in transition are affected. At the initiation of the transfer, some transactions may be currently accessing the data from the sub-partition on node X. New transactions will be performed by function shipping the transactions to node Y. Because these transactions may be running concurrently at nodes X and Y and accessing the same sub-partition during the transition period, concurrency control and buffer coherency control are required.

One technique for providing the required controls is described here: During the transition period, node X will maintain block locks for all physical blocks accessed by (remaining) transactions at node X and (new) transactions at node Y. Node Y will purge all blocks from its buffer at commit time. During the transition, node Y performs I/O shipping to node X and node Y must perform two-phase commits to node X. When the remaining transactions are completed, node X ceases locking and no longer participates in the two-phase commit processing.

For simplicity we assume that block locks are exclusive; thus, during a transition, transactions can access the block either at the old logical owner or at the new logical owner but not at both. Those skilled in the art will readily appreciate that this can be extended to other levels of sharing. When a block lock is obtained at the logical owner or the old logical owner, a wait may be necessary until any existing lock on the block is released. In addition to block locks, a count of the number of transactions that have interest in a block at a logical owner (either the old logical owner or the new logical owner) is maintained. This allows simultaneous access to the block by different transactions at the same node. When the interest count goes to zero, indicating that all transactions that have interest in the block have committed, the corresponding block lock is released.

While a specific combination of locks, interest bits, logs and other information is used in the embodiment described, those skilled in the art will readily appreciate that other combinations, levels of locking, etc. can be used to achieve the desired objective.

Figure 6:
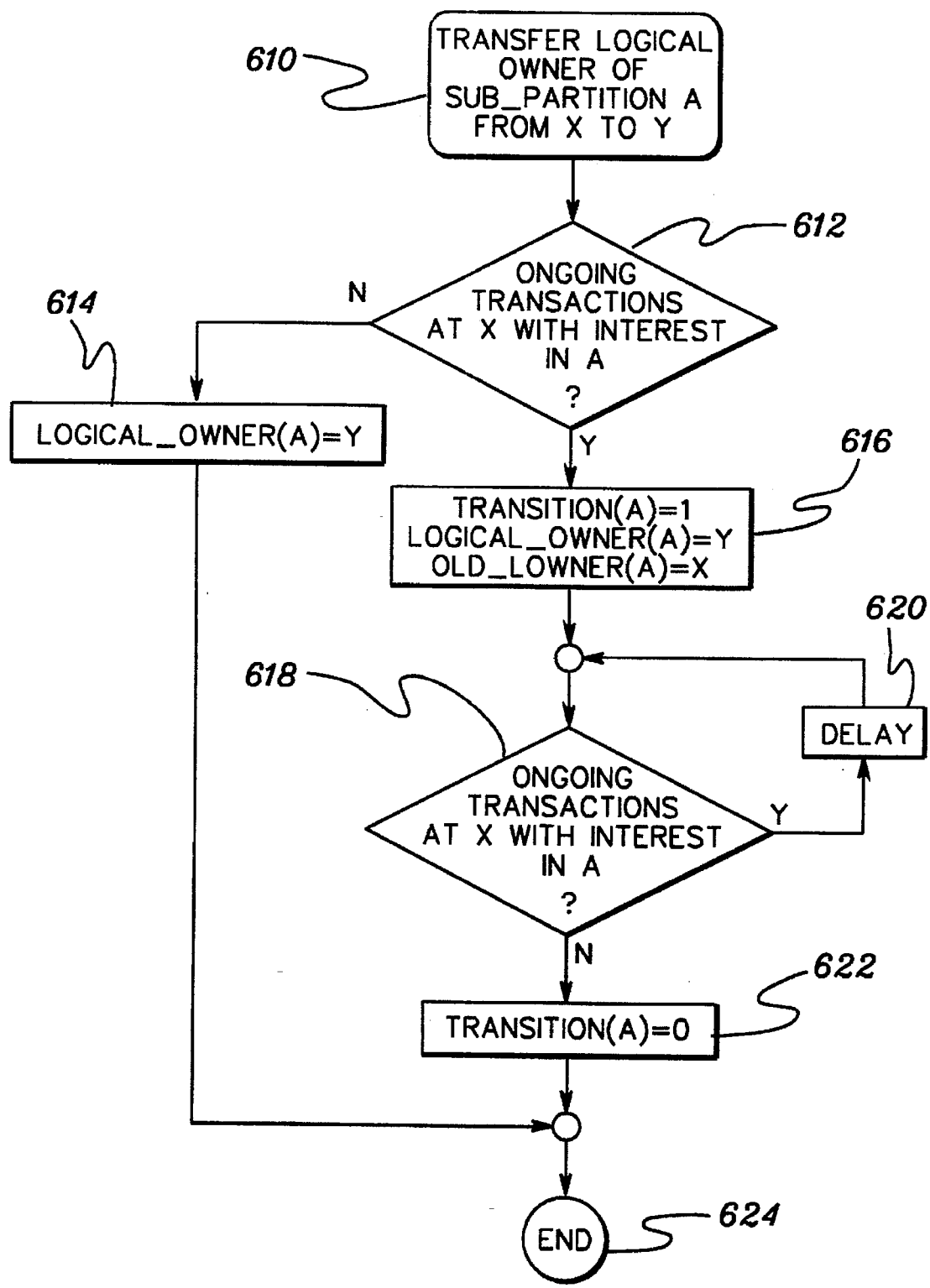
FIG. 6 is one example of a flow diagram which illustrates the operation of transferring a logical ownership between nodes, in accordance with the principles of the present invention.

FIGS. 6 and 7 depict the processing steps associated with an embodiment of the transfer technique. In addition, FIG. 7 depicts additional detail of normal processing when a transition is not present. Referring first to FIG. 6, three states are controlled during the transition. The first, TRANSITION (A), is set to "1" if a transition occurs with transactions possible at both nodes X and Y relating to sub-partition A. The second, LOGICAL_OWNER(A), holds a value corresponding to the next, or "new" logical owner of A, and the third, OLD_LOWNER(A), holds a value corresponding to the prior logical owner of A.

Upon entry through STEP 610, "MOVE LOGICAL OWNER OF SUB-PARTITION A FROM X TO Y," INQUIRY 612, "ONGOING TRANSACTIONS AT X WITH AN INTEREST IN A?" is encountered. This status is maintained at the current logical owner X. If the result is negative, the ownership can be moved to Y immediately via STEP 614, "LOGICAL_OWNER(A)=Y" in which the logical owner of A is globally and atomically changed to Y. No concurrency control or buffer coherency control is required in this situation because no competing transactions exist. The global and atomic change of logical ownership information can be accomplished in many ways. For instance, one method involves temporarily halting/latching out accesses to sub-partition A at the current logical owner X, changing the logical ownership information (tables) for object A at all nodes to Y, and rejecting and resubmitting any requests for sub-partition A that may have arrived at X in the interim.

If the result of INQUIRY 612 is positive, STEP 616 results in which the three states discussed above are set, most notably, TRANSITION(A) is set to "1" denoting a transition (i.e., potentially competing transactions). As above, global and atomic changes of these variables can be accomplished in many ways, and one method is that of temporarily halting access to object A at the current logical owner X, as outlined above.

INQUIRY 618 and STEP 620 together result in a continuing transition state (i.e., TRANSITION(A)="1") until competing transactions at X cease. At that time, STEP 622, "TRANSITION(A)=0" is encountered which denotes the end of a transition phase. FIG. 7 illustrates how potentially competing transactions react to a sub-partition in transition in addition to the steps involved with normal operation, i.e., the sub-partition is not in transition.

Figure 7A:
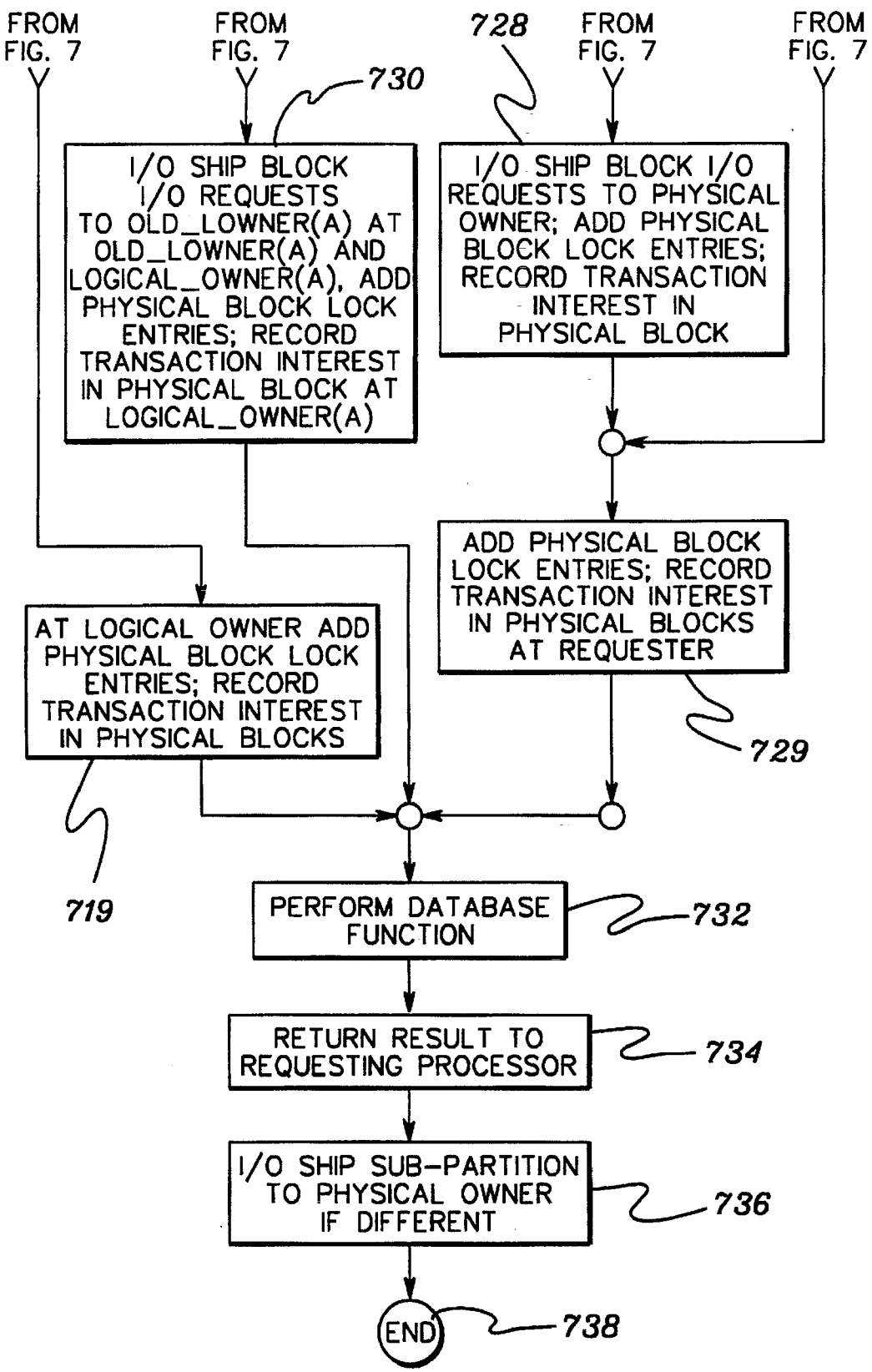

Referring to FIG. 7, upon entry through STEP 710, "DATABASE REQUEST TO SUB-PARTITION A BY TRANSACTION T AT PROCESSOR P," INQUIRY 712, "TRANSITION(A)=1 AND TRANSACTION T HAS PREVIOUSLY ACCESSED A?" is encountered. A negative result implies that either condition is not true and the process proceeds generally along the left side of the drawing. In this case, the request will proceed on the new logical owner of the sub-partition as denoted by the state LOGICAL_OWNER(A). INQUIRY 714, "LOGICAL_OWNER(A)= P?" is encountered which merely determines whether the requesting processor "P" can process the request locally. If not, STEP 716, "FUNCTION SHIP DATABASE REQUEST TO LOGICAL_OWNER(A)" is performed which sends the request to the corresponding logical owner. INQUIRY 718, "ALL SUB-PARTITION DATA BLOCKS AT LOGICAL_OWNER(A)?" is encountered which will determine whether I/O shipping at the logical owner is required to complete the request. If all blocks are available, block locks on the required blocks are obtained at the logical owner and a record of interest in the block(s) by transaction T is maintained (i.e., the interest count in the block(s) is incremented), STEP 719 (FIG. 7a). Thereafter, STEPS 732, 734 and 736 are encountered in which the request/function is performed, the result is returned, data is returned (if required), and STEP 738, "END" denotes the successful completion of the request.

If the result of INQUIRY 718 is negative, i.e., I/O is required to retrieve data, an additional INQUIRY 720, "TRANSITION(A)=1?" is encountered which tests the transition state as determined by the procedure discussed above with reference to FIG. 6. If the sub-partition is not in transition, simple I/O shipping is performed between the logical owner and the physical owner, physical locking is performed and the transaction interest is recorded (i.e., the interest count is incremented), STEPS 728 and 729. Following STEP 729, the request is performed in STEPS 732, 734 and 736 and the processing ends.

If the sub-partition is under transition as determined by INQUIRY 720 (FIG. 7), the required blocks are I/O shipped to the old logical owner(s) (the old logical owner may itself I/O ship the request to the physical owner if it does not have the block), block locks on the required blocks are obtained at the logical owner and the old logical owner, and a record of interest in the block(s) by transaction T is maintained (i.e., the interest count in the block(s) is incremented), STEP 730. The function is then performed in STEPS 732, 734 and 736. This is consistent with the technique described above in which node Y must I/O ship to/from node X if the sub-partition is in transition.

Returning now to INQUIRY 712 of FIG. 7, if the sub-partition is in transition and an on-going transaction issues the request, the technique requires processing the request through the old logical owner, and is represented generally by the right side of FIG. 7. Following this positive result from INQUIRY 712, INQUIRY 722 and STEP 724 result in shipping the request to OLD_LOWNER(A) if the requesting processor "P" is not the old owner. At the old owner, a determination is made as to whether all the sub-partition data blocks are at the old logical owner, INQUIRY 726, "ALL SUB-PARTITION DATA BLOCKS AT OLD_LOWNER(A)?". A positive result indicates that the request can be performed in STEPS 732, 734 and 736, following STEP 729, in which physical locking is performed and the interest in the transaction is recorded (i.e., the interest count in the blocks is incremented). A negative result at INQUIRY 726 results in performing simple I/O shipping between the old logical owner and the physical owner, STEP 728. STEP 729, "ADD PHYSICAL BLOCK LOCK ENTRIES; RECORD TRANSACTION INTEREST IN PHYSICAL BLOCKS AT REQUESTER" is then encountered, as described above, and the transaction can then be performed in STEPS 732, 734 and 736.

During the transition period, in one embodiment, nodes X and Y could perform logging to a log-server that provides a form of merged logs for transactions accessing a sub-partition in transition. A mechanism could be provided that enables nodes X and Y to write updates to a single logical log file. No further synchronization is necessary if page locks are held until commit because the logs are flushed at commit time. A pure shared nothing database does not need any form of merged log since each node can maintain a log of updates corresponding to the partition stored at each respective node.

Figure 8:
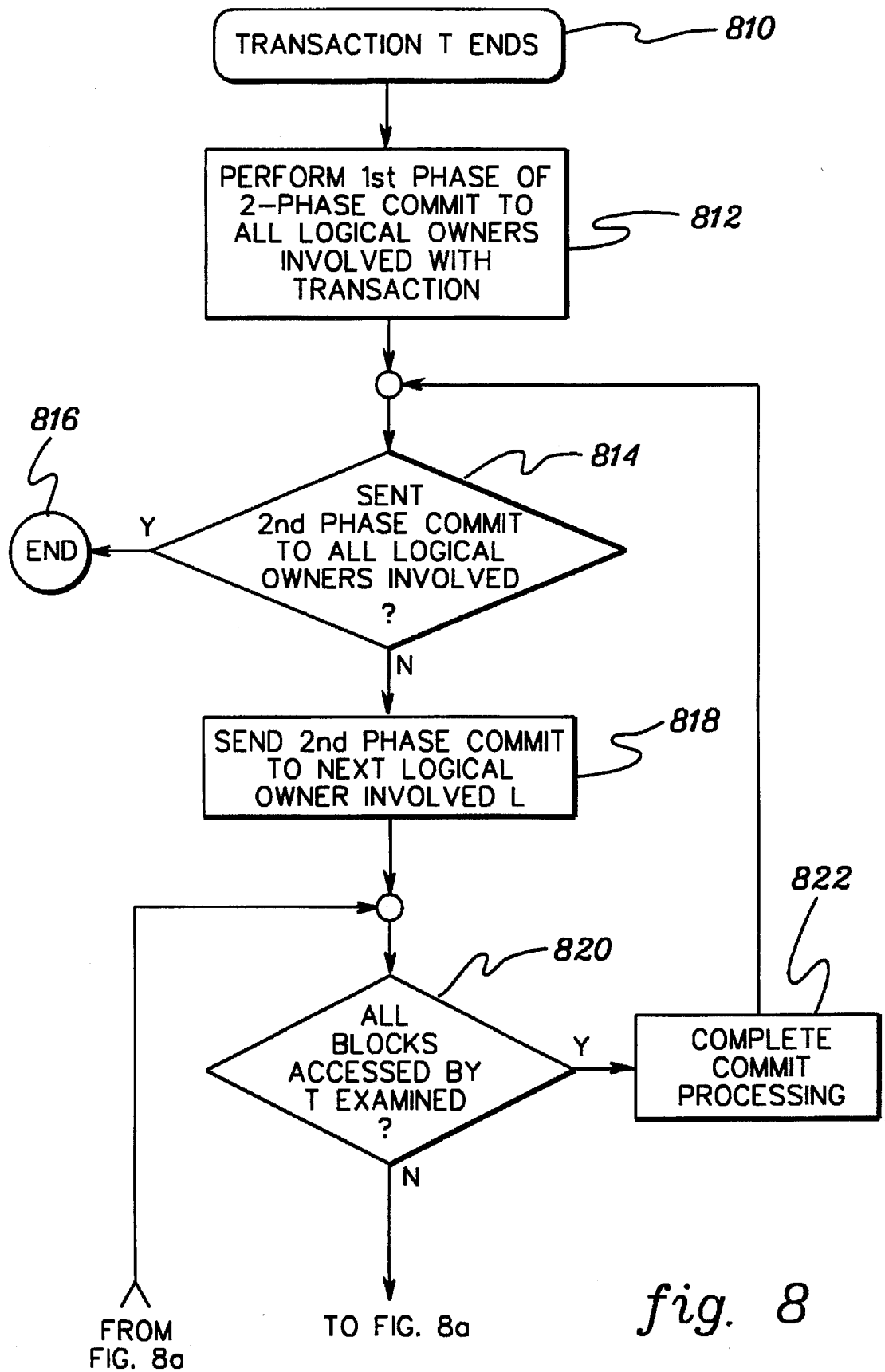
FIGS. 8–8a depict one embodiment of a flow diagram which illustrates the steps performed following completion of a transaction involving multiple sub-partitions, in accordance with the principles of the present invention.
Figure 8A:
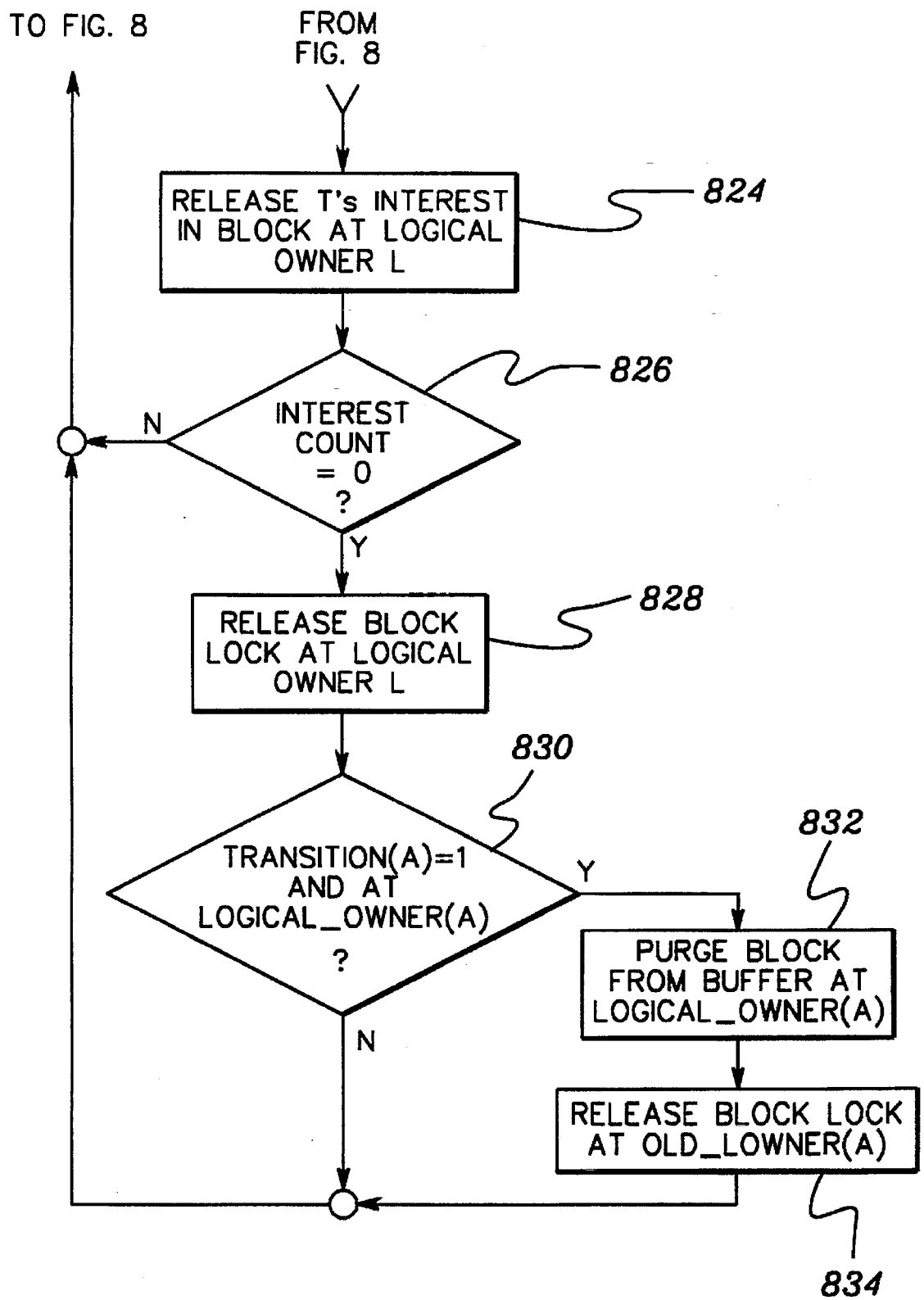

FIG. 8 illustrates a possible procedure for completing a transaction when two-phase commit processing and separate logs are employed. Because each transaction may issue requests to multiple sub-partitions, each with its own logical owner, the procedure must issue a commit to each logical owner. A two-phase commit process is assumed. Those skilled in the art will readily appreciate that the two-phase commit is between a coordinator node, typically the node at which transaction T runs, and the other logical owners for each of the sub-partitions accessed by transaction T. As described below, additional operations can be added to the second phase of the commit process pertaining to releasing block locks and interest of the transaction in blocks accessed during the database operations comprising the transaction.

Entry is through STEP 810, "TRANSACTION T ENDS." Subsequently, the first phase of the two-phase commit process is executed at all the logical owners involved with the transaction, STEP 812. Those skilled in the art will appreciate that this may involve sending messages to all the logical owners involved, logging the required information at each of these nodes, and returning either a positive acknowledgement or an abort message to the coordinator.

The loop starting with INQUIRY 814, "SENT 2nd PHASE COMMIT TO ALL LOGICAL OWNERS INVOLVED?" corresponds to the second phase of commit processing. The "N" (NO) branch of STEP 814 is repeated until a commit (or abort) message is sent to each of the logical owners involved in the commit processing for transaction T in STEP 818, "SEND 2nd PHASE COMMIT TO NEXT LOGICAL OWNER INVOLVED L." While the messages for the second phase of commit processing are shown being sent sequentially, those skilled in the art will appreciate that, as is commonly done, the commit/abort messages can be sent in parallel to each of the logical owners involved.

The loop starting with INQUIRY 820, "ALL BLOCKS ACCESSED BY T EXAMINED?" is for releasing block locks and interest in each of the blocks accessed by the transaction at the logical owner involved. The "N" (negative) branch of INQUIRY 820 is repeated until all the blocks accessed by transaction T at the logical owner involved have been processed. In STEP 824, interest of transaction T in the block is released (i.e., the interest count in the block is decremented.) If the interest count goes to zero as tested by INQUIRY 826, "INTEREST COUNT=0?" (i e., no transaction at the logical owner with interest in the block), the lock on the block is released at the logical owner in STEP 828, "RELEASE BLOCK LOCK AT LOGICAL_ OWNER L." Note that the logical owner involved may either be the old logical owner (the sub-partition which contains the block must then be in transition) or the new logical owner. If the interest count goes to zero (INQUIRY 826), and if the request is at the new logical owner and the corresponding object is in transition (INQUIRY 830), then the block is purged from the buffer at the new logical owner in STEP 832, "PURGE BLOCK FROM BUFFER AT LOGICAL_OWNER(A)," and the block lock is released at the old logical owner in STEP 834, "RELEASE BLOCK LOCK AT OLD_LOWNER(A)" This allows a transaction requiring access to the block at the old logical owner to proceed. Recall that during the transition the corresponding sub-partition may be accessed at both the new and the old logical owners.

After these operations have been carried out for each block accessed by the transaction, the normal operations for the second phase of commit are carried out in STEP 822, "COMPLETE COMMIT PROCESSING." Those skilled in the art will appreciate that these include operations such as writing the log, releasing record locks, and completing clean-up operations for the resources invoked by the transaction.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for partitioning a database in a data processing system, said method comprising the steps of:

dividing the database into a plurality of data partitions, each of said plurality of data partitions having a physical owner associated therewith; and assigning to each of said plurality of data partitions a logical owner wherein said logical owner provides access to its corresponding data partition, wherein one or more physical owners corresponds to said plurality of data partitions, wherein one or more logical owners corresponds to said plurality of data partitions, and wherein said step of assigning comprises the step of reassigning to one or more of the plurality of data partitions one or more next logical owners, the step of reassigning comprising the steps of:

defining a neighborhood of solutions about said one or more logical owners according to at least one definition constraint; and searching said neighborhood of solutions for a proposed one or more next logical owners according to at least one search constraint.

2. The method of claim 1, wherein the step of reassigning comprises the step of, upon finding a proposed one or more next logical owners, checking said proposed one or more next logical owners according to at least one check constraint, and wherein said step of reassigning includes reassigning to said one or more of the plurality of data partitions the proposed one or more next logical owners if a result of said step of checking is acceptable.

3. The method of claim 2, wherein said at least one check constraint comprises one of the following: a minimum achievable system response time, one or more predefined allowable assignments, and a maximum number of assignments different from said one or more logical owners.

4. The method of claim 2, wherein the step of reassigning comprises repeating said steps of searching and checking, if a result of said step of checking is unacceptable.

5. The method of claim 1, wherein said at least one search constraint comprises one of the following: a maximum transaction cost at one of said one or more next logical owners, one or more predefined allowable assignments, and a maximum number of assignments different from said one or more logical owners.

6. The method of claim 1, wherein said at least one definition constraint comprises a maximum number of assignments different from said one or more logical owners or a maximum number of assignments different from said one or more physical owners.

7. A method for partitioning a database in a data processing system, said method comprising the steps of:

dividing the database into a plurality of data partitions, each of said plurality of data partitions having a physical owner associated therewith; and assigning to each of said plurality of data partitions a logical owner wherein said logical owner provides access to its corresponding data partition, and wherein one or more physical owners corresponds to said plurality of data partitions, wherein one or more logical owners corresponds to said plurality of data partitions, said step of assigning comprising the step of reassigning to one or more of the plurality of data partitions one or more next logical owners, wherein said step of reassigning comprises reassigning to one or more next logical owners according to at least one reassignment constraint, wherein said at least one reassignment constraint comprises one of the following: a maximum transaction cost at one of said one or more next logical owners, a maximum number of assignments different from said one or more logical owners, a maximum number of assignments different from said one or more physical owners, a minimum achievable system response time, and one or more predefined allowable assignments.

8. A method for balancing a processing load in a data processing system having a first physical processing node and a second physical processing node, said first physical processing node having a first data partition stored thereon and said second physical processing node having a second data partition stored thereon, said method comprising the steps of:

assigning a first logical processing node to said first data partition, said first logical processing node performing one or more database requests using said first data partition; and reassigning to said first data partition a second logical processing node, said first logical processing node and said second logical processing node being different processing nodes, said second logical processing node performing one or more subsequent database requests using said first data partition, wherein the step of reassigning comprises the steps of:

defining a neighborhood of solutions about said first logical processing node according to at least one definition constraint; and searching said neighborhood of solutions for a proposed second logical processing node according to at least one search constraint.

9. The method of claim 8, wherein the step of reassigning comprises the step of, upon finding said proposed second logical processing node, checking said proposed second logical processing node according to at least one check constraint, and reassigning said first data partition to said proposed second logical processing node if a result of said step of checking is acceptable.

10. The method of claim 9, wherein said at least one check constraint comprises one of the following: a minimum achievable system response time, one or more predefined allowable assignments, and a maximum number of assignments different from said first logical processing node.

11. The method of claim 8, wherein said at least one search constraint comprises one of the following: a maximum transaction cost at said logical processing node, one or more predefined allowable assignments, and a maximum number of assignments different from said first logical processing node.

12. The method of claim 8, wherein said at least one definition constraint comprises a maximum number of assignments different from said first logical processing node or a maximum number of assignments different from said first and second physical processing nodes.

13. A method for balancing a processing load in a data processing system having a first physical processing node and a second physical processing node, said first physical processing node having a first data partition stored thereon and said second physical processing node having a second data partition stored thereon, said method comprising the steps of:

assigning a first logical processing node to said first data partition, said first logical processing node performing one or more database requests using said first data partition; and reassigning to said first data partition a second logical processing node, said first logical processing node and said second logical processing node being different processing nodes, said second logical processing node performing one or more subsequent database requests using said first data partition, said step of reassigning comprising reassigning to said first data partition one or more second logical processing nodes according to at least one reassignment constraint, wherein said at least one reassignment constraint comprises one of the following: a maximum transaction cost at said first logical processing node, a maximum number of assignments different from said first logical processing node, a maximum number of assignments different from said first and second physical processing nodes, a minimum achievable system response time, and one or more predefined allowable assignments.

14. A system for partitioning a database in a data processing system, said system comprising:

means for dividing the database into a plurality of data partitions, each of said plurality of data partitions having a physical owner associated therewith; and means for assigning to each of said plurality of data partitions a logical owner wherein said logical owner provides access to its corresponding data partition, wherein one or more physical owners corresponds to said plurality of data partitions, wherein one or more logical owners corresponds to said plurality of data partitions, and wherein said assigning means comprises means for reassigning to one or more of the plurality of data partitions one or more next logical owners, the reassigning means comprising:

means for defining a neighborhood of solutions about said one or more logical owners according to at least one definition constraint; and means for searching said neighborhood of solutions for a proposed one or more next logical owners according to at least one search constraint.

15. The system of claim 14, wherein said reassigning means comprises means for, upon finding a proposed one or more next logical owners, checking said proposed one or more next logical owners according to at least one check constraint, and wherein said reassigning means includes means for reassigning to said one or more of the plurality of data partitions the proposed one or more next logical owners if a result of said step of checking is acceptable.

16. The system of claim 15, wherein said at least one check constraint comprises one of the following: a minimum achievable system response time, one or more predefined allowable assignments, and a maximum number of assignments different from said one or more logical owners.

17. The system of claim 15, wherein said reassigning means comprises means for repeating said searching and checking, if a result of said checking means is unacceptable.

18. The system of claim 14, wherein said at least one search constraint comprises one of the following: a maximum transaction cost at one of said one or more next logical owners, one or more predefined allowable assignments, and a maximum number of assignments different from said one or more logical owners.

19. The system of claim 14, wherein said at least one definition constraint comprises a maximum number of assignments different from said one or more logical owners or a maximum number of assignments different from said one or more physical owners.

20. A system for partitioning a database in a data processing system, said system comprising:

means for dividing the database into a plurality of data partitions, each of said plurality of data partitions having a physical owner associated therewith; and means for assigning to each of said plurality of data partitions a logical owner wherein said logical owner provides access to its corresponding data partition, and wherein one or more physical owners corresponds to said plurality of data partitions, wherein one or more logical owners corresponds to said plurality of data partitions, said assigning means comprising means for reassigning to one or more of the plurality of data partitions one or more next logical owners, wherein said reassigning means comprises reassigning to one or more next logical owners according to at least one reassignment constraint, wherein said at least one reassignment constraint comprises one of the following: a maximum transaction cost at one of said one or more next logical owners, a maximum number of assignments different from said one or more logical owners, a maximum number of assignments different from said one or more physical owners, a minimum achievable system response time, and one or more predefined allowable assignments.

21. A system for balancing a processing load in a data processing system having a first physical processing node and a second physical processing node, said first physical processing node having a first data partition stored thereon and said second physical processing node having a second data partition stored thereon, said system comprising:

means for assigning a first logical processing node to said first data partition, said first logical processing node performing one or more database requests using said first data partition; and means for reassigning to said first data partition a second logical processing node, said first logical processing node and said second logical processing node being different processing nodes, said second logical processing node performing one or more subsequent database requests using said first data partition, wherein the reassigning means comprises:

means for defining a neighborhood of solutions about said first logical processing node according to at least one definition constraint; and means for searching said neighborhood of solutions for a proposed second logical processing node according to at least one search constraint.

22. The system of claim 21, wherein the reassigning means comprises means for, upon finding said proposed second logical processing node, checking said proposed second logical processing node according to at least one check constraint, and reassigning said first data partition to said proposed second logical processing node if a result of said checking means is acceptable.

23. The system of claim 22, wherein said at least one check constraint comprises one of the following: a minimum achievable system response time, one or more predefined allowable assignments, and a maximum number of assignments different from said first logical processing node.

24. The system of claim 21, wherein said at least one search constraint comprises one of the following: a maximum transaction cost at said logical processing node, one or more predefined allowable assignments, and a maximum number of assignments different from said first logical processing node.

25. The system of claim 21, wherein said at least one definition constraint comprises a maximum number of assignments different from said first logical processing node or a maximum number of assignments different from said first and second physical processing nodes.

26. A system for balancing a processing load in a data processing system having a first physical processing node and a second physical processing node, said first physical processing node having a first data partition stored thereon and said second physical processing node having a second data partition stored thereon, said system comprising:

means for assigning a first logical processing node to said first data partition, said first logical processing node performing one or more database requests using said first data partition; and means for reassigning to said first data partition a second logical processing node, said first logical processing node and said second logical processing node being different processing nodes, said second logical processing node performing one or more subsequent database requests using said first data partition, said reassigning means comprising means for reassigning to said first data partition one or more second logical processing nodes according to at least one reassignment constraint, wherein said at least one reassignment constraint comprises one of the following: a maximum transaction cost at said first logical processing node, a maximum number of assignments different from said first logical processing node, a maximum number of assignments different from said first and second physical processing nodes, a minimum achievable system response time, and one or more predefined allowable assignments.

* * * * *